United States Patent [19]
Ford

[11] Patent Number: 6,150,796
[45] Date of Patent: Nov. 21, 2000

[54] LOW CURRENT VEHICULAR ADAPTER CHARGER

[75] Inventor: Robert B. Ford, Tamarac, Fla.

[73] Assignee: Motorola, Inc., Schaumburg, Ill.

[21] Appl. No.: 09/422,769

[22] Filed: Oct. 22, 1999

[51] Int. Cl.[7] .......................... H01M 10/46; H01M 10/44
[52] U.S. Cl. ................... 320/128; 320/138; 320/DIG. 12
[58] Field of Search ..................... 320/103, 104, 320/107, 112, 121, 127, 128, 135, 138, DIG. 12

[56] References Cited

U.S. PATENT DOCUMENTS

| | | |
|---|---|---|
| Re. 36,225 | 6/1999 | Harris . |
| 5,191,277 | 3/1993 | Ishikura et al. . |
| 5,200,688 | 4/1993 | Patino et al. . |
| 5,229,703 | 7/1993 | Harris . |
| 5,371,453 | 12/1994 | Fernandez . |
| 5,736,831 | 4/1998 | Harrington . |
| 5,872,704 | 2/1999 | Kim . |
| 5,903,133 | 5/1999 | Amero, Jr., et al. . |

*Primary Examiner*—Edward H. Tso
*Attorney, Agent, or Firm*—Barbara R. Doutre

[57] ABSTRACT

A method and apparatus for a mobile battery charging arrangement (100, 104, 114) utilizes a controllable power switch (306) to selectively switch power from a vehicular power source (114), such as a vehicle battery, to a battery charging circuit (101) to provide a charge to a rechargeable portable battery (104) for a portable battery operated device such as a portable communication radio (106). A battery present detector (102) controls the controllable power switch (306) to switch in the power from the vehicular battery power source (114) to the battery charging circuit (101) only while the rechargeable portable battery (104) is electrically coupled to the battery charging circuit (101) for receiving a charge therefrom.

8 Claims, 4 Drawing Sheets

LOW CURRENT VEHICULAR ADAPTER CHARGER

BACKGROUND OF THE INVENTION

1. Field of the Invention

This invention relates in general to battery charger arrangements for portable battery operated devices, and more particularly to a battery charger arrangement suitable for use with portable radio communication devices in vehicular and/or other mobile environments.

2. Description of the Prior Art

Portable battery operated devices have benefited from remarkable improvements in battery life and battery charging facilities. Preferably, a portable battery operated device can be recharged in its normal use environment. Although certain portable battery operated devices are normally used near electrical outlets providing unlimited power supply, in many applications, the portable battery operated device is used for extended periods of time in an open outdoor and/or mobile application environment, where there is no readily available unlimited power source such as a wall outlet. In these mobile applications, there may only be available a vehicular battery power supply or other such mobile battery power supply as the only source for recharging a portable device's rechargeable battery. For example, a portable radio, such as utilized by government, police, and fire rescue service personnel may only have available the battery power source of their vehicles to provide recharge to their battery operated portable radios. Additionally, cellular phones and other such portable communication devices are typically operated from a battery source and when used in mobile or outdoor applications, may only have available a battery power source from a local vehicle, such as a car or boat or other such mobile environment providing a battery power source for recharging the cellular radio or other communication device.

When such a portable battery operated device requires recharging of the rechargeable battery, typically, a battery charging arrangement, such as via an adapter to the battery power source of the vehicle, is provided for charging the rechargeable battery of the portable device. Unfortunately, such arrangements in the past have provided a constant drain on the battery power supply of the vehicle, even when the portable battery operated device is not being recharged. This continuous drain on the vehicular battery power source tends to put a strain on the battery of the vehicle, which if left unattended for a significantly long time can deplete the battery of the vehicle or substantially weaken it to the point of reducing its capability to provide a starting charge for the vehicle's engine. This can be particularly dangerous in frigid climates where the power source of the vehicle must reliably start the vehicle to allow operation of the vehicle to commute to safety under harsh weather conditions. Additionally, where police and safety concerns are at issue, a reliable vehicle power source is a must.

Therefore, there is a need to eliminate those specific disadvantages of the prior art as discussed above, and particularly to maintain maximum power available from a mobile and/or vehicular battery power source while providing ready charging facilities for a portable battery operated device, such as a portable communication radio.

DESCRIPTION OF A PREFERRED EMBODIMENT

Previous to the present invention, battery charger arrangements in mobile applications, such as in vehicles, would continue to draw supply source current to a battery charger for charging the battery in a portable battery operated device, such as a portable radio, even while the vehicle was turned off. This continued drain on the vehicle battery in many cases was unacceptable, potentially leading to reduced performance and failure of the vehicle battery to provide enough charge to start the vehicle. Additionally, when the battery operated portable device was not connected to the charger, the charger would maintain certain charger circuits in an ON state to be ready to function on immediate demand. This additional drain on the vehicle battery, even while a portable battery operated device such as a portable radio was not being charged, further drained the vehicle battery degrading the performance of the vehicle battery such as to start an engine for the vehicle.

Of course, the battery charger could be physically disconnected, or turned OFF, to prevent any current drain from the vehicle battery. Besides the unfortunate additional manual steps required of a user of the charger and vehicle, by disconnecting the charger from the vehicles battery power supply it sacrifices the ability of the charger to readily respond to user needs by providing battery charging to the portable battery operated device under certain conditions. For example, a user may need immediate power when turning ON the portable radio. If the portable radio battery is depleted, the vehicle's battery may be the only power supply available to operate the portable radio.

The present invention advantageously provides continual charging ability to a battery operated portable device while exhibiting minimal drain current from a vehicle battery power source when a charger arrangement is not in use charging a battery of a portable battery operated device such as a portable radio.

Figure 1:
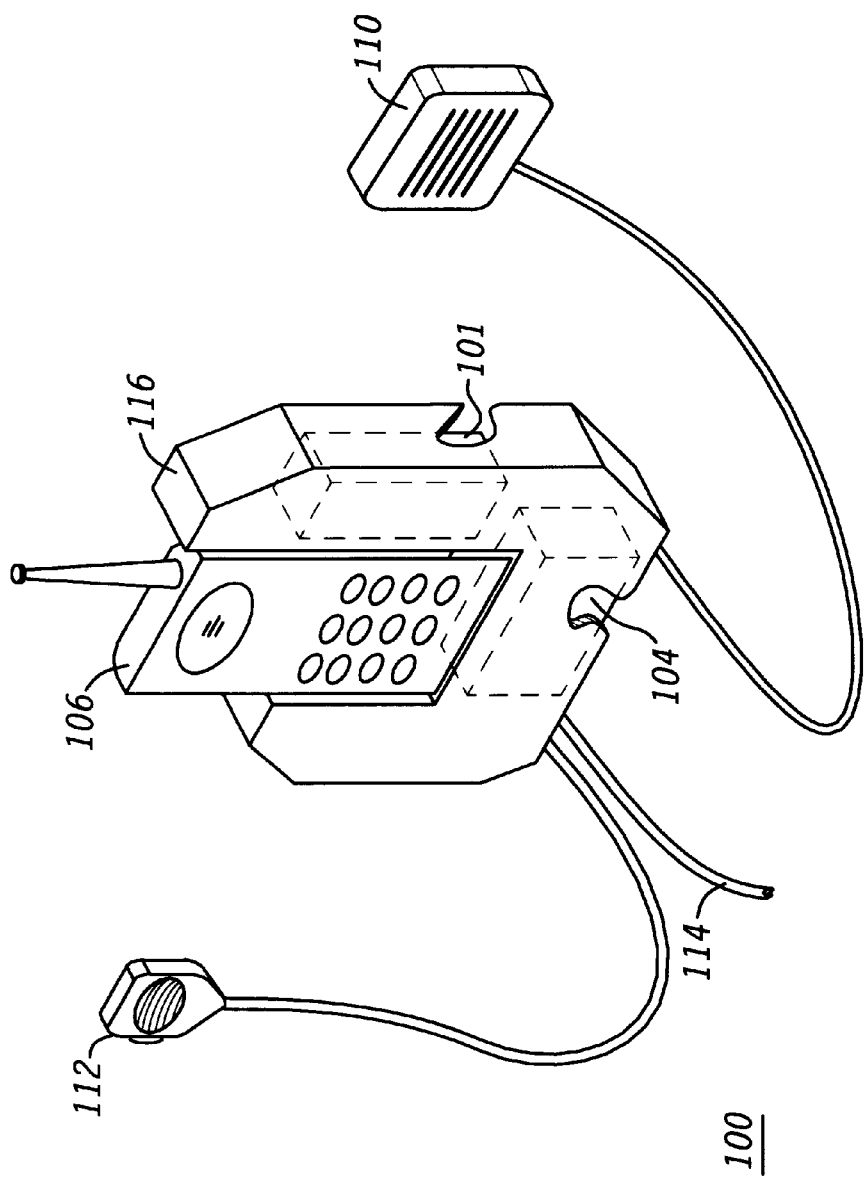
FIG. 1 is a front perspective view of a portable battery operated device and a vehicular adapter charger arrangement according to a preferred embodiment of the present invention.

Referring to FIG. 1, a vehicular charger adapter 100, ("VA"), in a preferred embodiment, is constructed with a housing 116 that is suitable for receiving a portable battery operated device such as a portable radio 106 that typically includes a rechargeable battery 104. The VA 100 is electrically coupled to a vehicle battery (not shown) via electrical cable 114. In the housing 116, as shown, a battery charger circuit 101 is electrically coupled to the vehicle battery via the cable 114 and to the portable radio battery 104 to provide a recharge to the portable radio battery 104 as necessary.

The VA 100 optionally may include other peripheral devices that can interoperate with the portable radio 106. For example, a mobile speaker 110 can boost the audio output of the portable radio 106 while the portable radio 106 is coupled to the VA 100. Additionally, a hand-held microphone 112 is electrically coupled to a microphone input (not shown) for the portable radio 106 thereby allowing a user to speak into the hand-held microphone 112 to transmit the spoken audio via the portable radio 106 while in a transmit mode. During a receive mode, the received audio from the portable radio 106 is provided to the external mobile speaker 110 for audible output to the user. In this way, the portable radio 106 when coupled to the VA 100 provides similar functions to a mobile radio device that is powered from a vehicle battery and power source. The VA support circuitry for these functions also draws supply current that is switched off when not in use (radio off) thereby conserving power.

Figure 2:
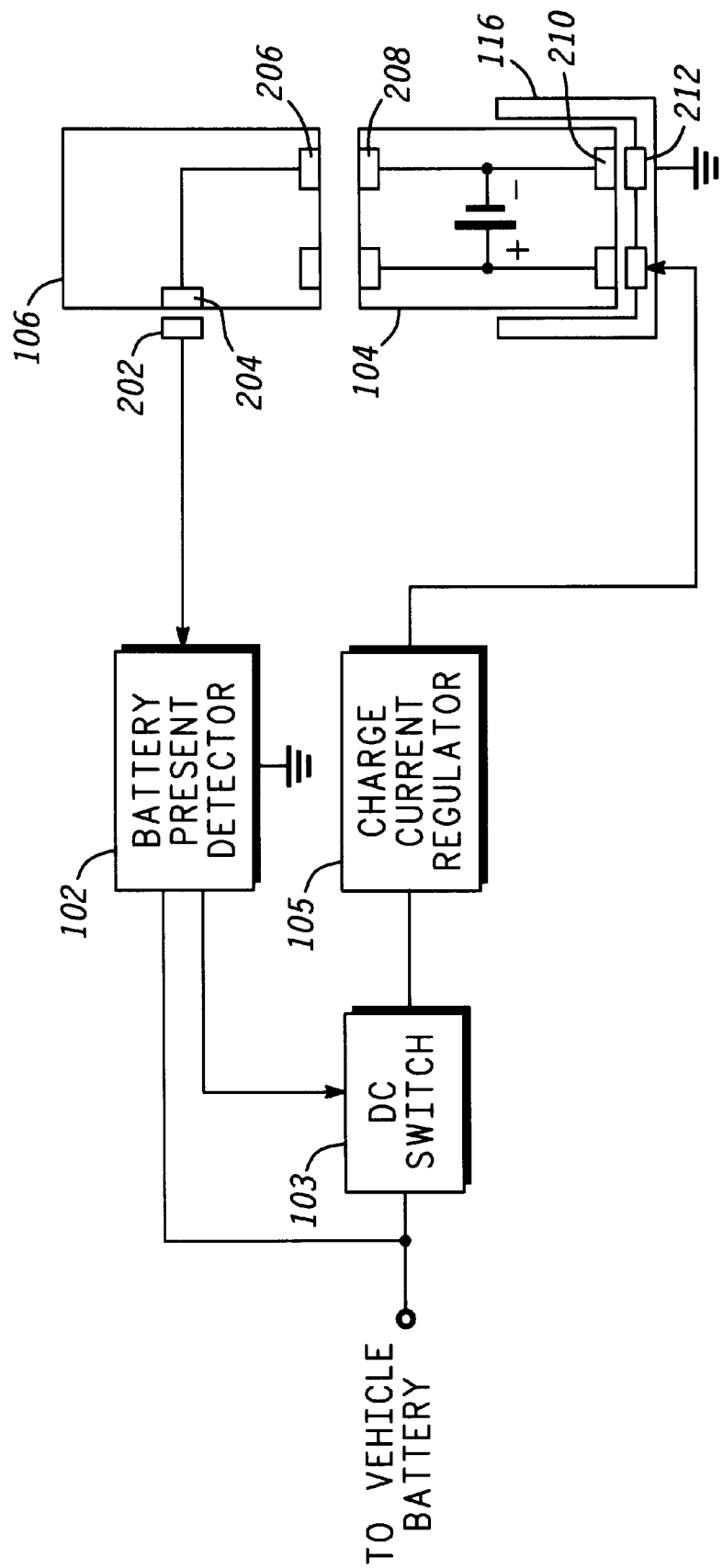
FIG. 2 is an electrical block diagram of the battery charger arrangement of FIG. 1 according to a preferred embodiment of the present invention.

Referring now to FIG. 1 and FIG. 2, the vehicular charger adapter 100 and the portable battery operated radio 106 are shown in a novel battery charging arrangement according to a preferred embodiment of the present invention. The VA 100 includes a battery present detector 102 that can indicate when the battery of a portable battery operated device is present in the VA 100 and thereby permit charging to the rechargeable battery of the portable battery operated device such as the portable radio 106.

This battery present detector 102 may require minimal current drain to operate from a vehicle battery, such as in the range of three to five milliamps. This is in stark contrast to a typical conventional battery charger coupled to a vehicle battery that may require hundreds of milliamps of standby current.

Additionally, a battery switch 103 is controlled by the battery present detector 102 to allow the vehicle battery charge to selectively drive a battery charging circuit 105 for charging a battery 104 of the portable radio 106. The radio 106, in one embodiment, includes an electrical path via a series of electrical contacts 204, 206, 208, 210, for indicating when the battery 104 is electrically coupled to the portable radio 106. This circuit additionally can perform other functions such as providing a path for power to be supplied from the battery 104 to the radio 106. However, the battery present detector 102 can utilize the available electrical path via the electrical contacts 204, 206, 208, 210, to affirmatively detect that the battery 104 is present and electrically coupled to the vehicular charger adapter 100.

Typically, when the radio 106 is inserted into a receiving slot in the housing 116, the two external electrical contacts 204, 210, can make electrical connection with two complementary electrical contacts 202, 212, in the VA 100. This provides a ground path through the radio 106 through the contact 202 and to the battery present detector 102. If the battery 104 is not present, then the circuit is open. Otherwise, the circuit is shorted to ground and the battery present detector 102 indicates that a portable radio 106 with battery 104 is present at the VA 100 and ready to be charged. This indication, along with other indicated information as will be discussed below, is utilized by the present invention to control the battery switch 103 to selectively allow the vehicle's battery to provide a charge to battery charging circuits 105 in the VA 100. This in turn selectively allows the charging of the battery 104 for the portable radio 106.

This smart vehicular charger adapter 100 maintains an open circuit via the switch 103 whenever the power drain to the vehicle battery is to be kept to a minimum. For example, if the portable radio 106 is not in the VA 100, then the switch 103 should be kept open to minimize the consumption of current through the charger circuits 105. Additionally, when the radio 106 is located in the VA 100, it may be desirable to keep the switch 103 in an open circuit when certain conditions are present. For example, if the portable radio 106 is not in use and its battery 104 is charged up to a certain predefined level, such as 90% of capacity, then there is no need for further recharging from the vehicle battery. In this case, the battery switch 103 is maintained open. Further, if the vehicle is in an off state, where the vehicular battery is the sole source of power for charging, it may be desirable to minimize the drain on the vehicle battery during these conditions and therefore the battery switch 103 is maintained in an open state. However, if the portable radio 106 is turned on and is consuming power and in use, then it would be appropriate to provide the available power from the vehicle battery to the portable radio 106 to maintain the portable radio's operation for as long as possible, as deemed necessary by a user. In such a case, the battery switch 103 would be in a closed position thereby allowing the charge current from the vehicle battery to flow through the switch 103 and to power the battery charging circuits 105. Such a condition, would be analogous to a user of the car radio turning the radio on while the vehicle is turned off. In such a case, the user would want the radio to continue to operate for as long as possible while the vehicle is able to provide power to the radio. The advantages of this smart VA 100, as can be seen from the discussion above, are significant over previous battery charger arrangements that simply continuously drained the vehicle battery even while the portable radio 106 was not present at the battery charger.

Figure 3:
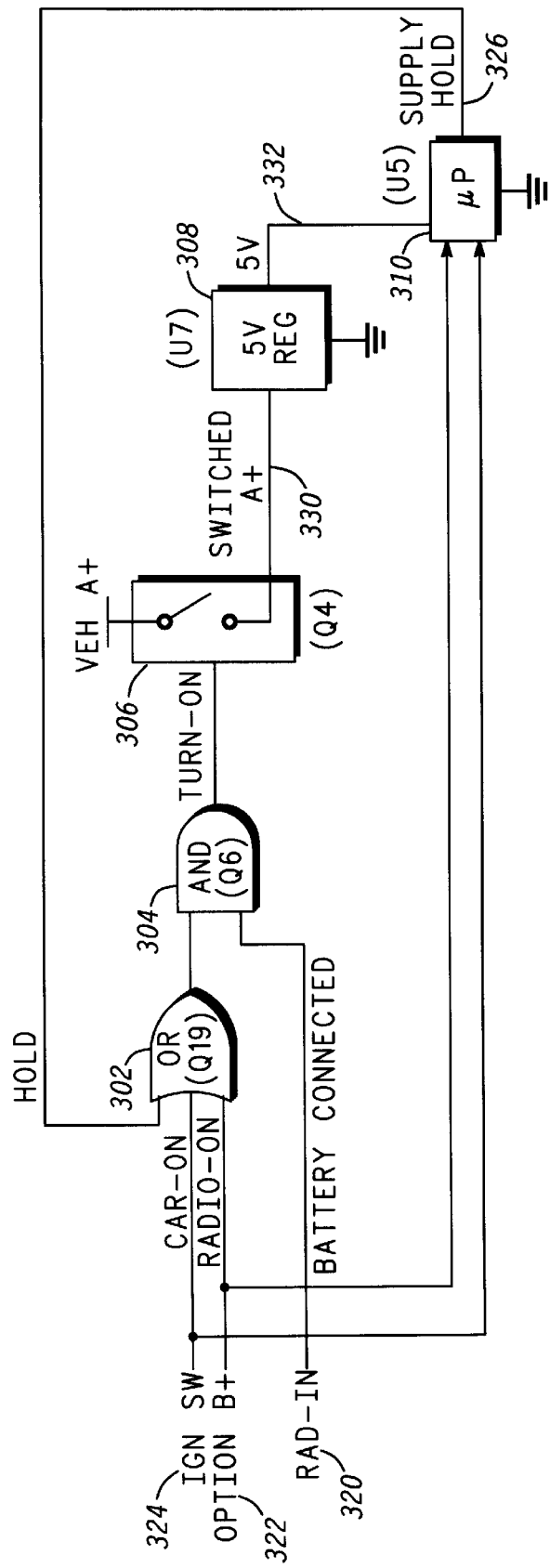
FIG. 3 is a logical block diagram illustrating an exemplary switching logic for interconnecting a battery operated portable device to a vehicular battery power source via the battery charging arrangement of FIG. 1 according to a preferred embodiment of the present invention.
Figure 4:
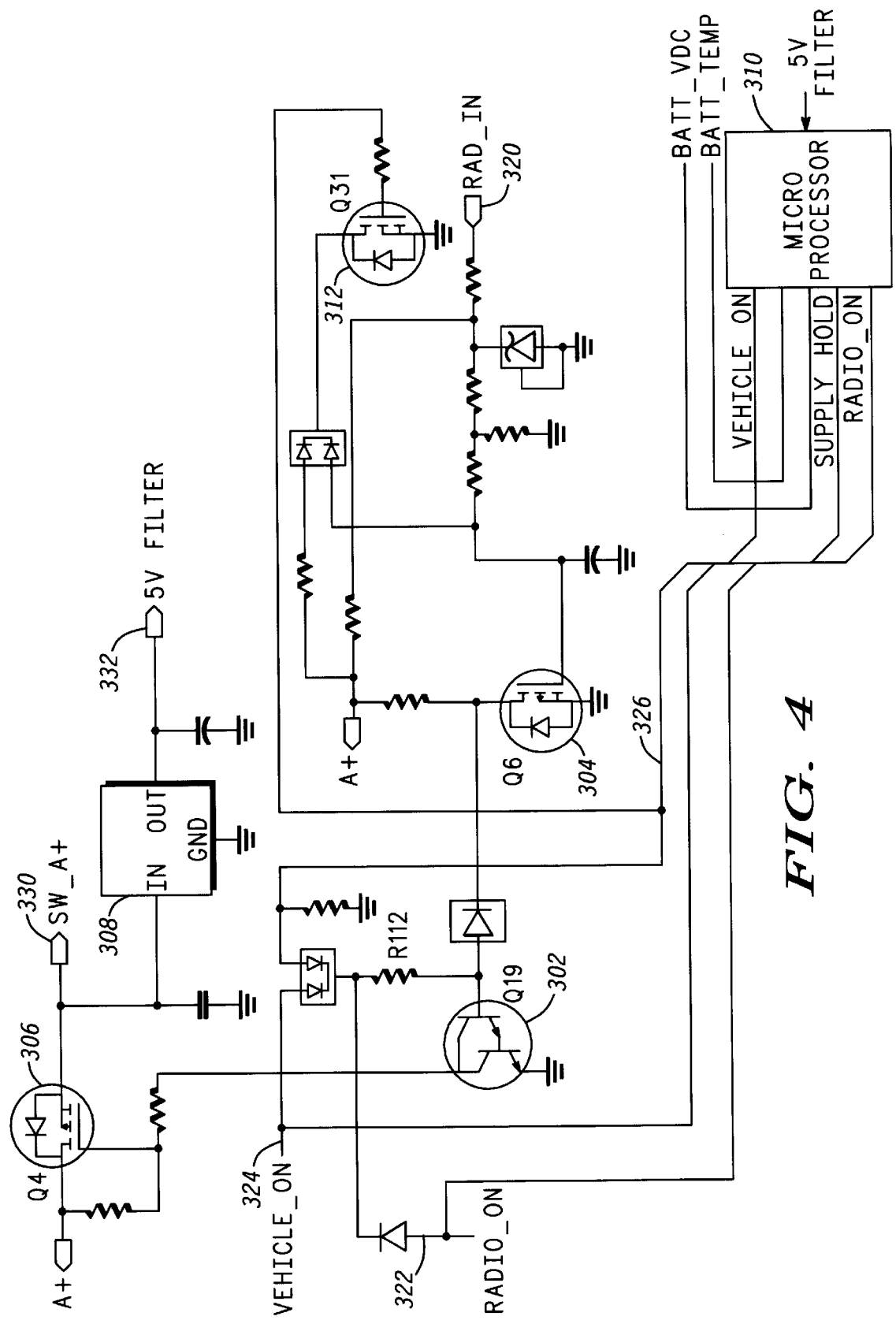
FIG. 4 is an electrical schematic view of the switching logic of FIG. 3 illustrating an exemplary implementation according to the preferred embodiment of the present invention.

With reference to FIG. 3 and FIG. 4, a new and novel battery charger control logic circuit is shown in accordance with a preferred embodiment of the present invention. FIG. 3 illustrates a logical block diagram of the battery charger logic control circuit shown in schematic form in FIG. 4. Although the logical diagram accurately depicts operational dependencies, the circuitry in FIG. 4 shows Q6 304 before Q19 302 in the circuit. A DC switch 306 is implemented utilizing a field effect transistor Q4 in this exemplary implementation. The DC switch 306 controls whether a vehicular battery power source is selectively switched into a switched power source at electrical point 330 past the DC switch 306. The battery power source at electrical point 330 can power battery charging circuits and also power a five volt regulator circuit 308 that provides a five volt power source at point 332 to provide five volt power to a controller 310, such as a microprocessor or other type of controller, and associated logic circuits.

A novel aspect of the present invention includes the ability to switch in the battery power source at electrical point 330 to power battery charging circuits to charge the rechargeable battery of a portable battery operated device, such as a portable radio, as necessary when the portable radio with its rechargeable battery are detected present at the battery charging arrangement, such as at the vehicular charging adapter 100. Such a detector may be implemented, for example, by utilizing transistor Q6 304 and transistor Q19 302 in a logical circuit arrangement with certain detection and control signals as will be discussed below.

A key detection signal utilized in the detector circuit is a battery connected signal 320 which is monitored by the detector circuit from the series of electrical contacts 202, 204, 206, 208, 210, 212, as illustrated in FIG. 2 and discussed above. When the battery connected signal 320 indicates that a battery to a portable radio is connected, a ground impedance is provided to the gate of the transistor switch Q6 304 which turns the transistor Q6 304 Off and then allows transistor Q19 302 to be driven through resistor R 112 thereby controlling the transistor switch Q4 306. On the other hand, if the battery is not present at the VA 100, then the battery connected signal 320 provides an impedance to a positive voltage at the gate of transistor switch Q6 304 thereby turning the transistor switch Q6 304 On and maintaining a ground impedance value at the base emitter junction to transistor switch Q19 302. This maintains the transistor switch Q19 302 in an open state and consequently also maintains the transistor switch Q4 306 in an open state preventing the vehicular battery power source from supplying charge to the switched power source line 330 that provides power to charge a rechargeable battery. In this way, the vehicular battery power is preserved until needed to be used when a portable battery operated device such as a portable radio is inserted into the adapter 100.

Additionally, it may be desirable to switch open the power supply and prevent depletion of the vehicle's battery under certain conditions even if the battery of the portable radio is connected to the VA 100. For example, if the vehicle is in an Off state, i.e., the alternator is idle and not generating power, and the portable battery operated radio is in an Off state, and the battery of the portable device is already charged up to a predetermined amount, then it would be desirable to maintain the switch 306 open to preserve the vehicle's battery power. However, if the vehicle's ignition switch is detected as being in an On state, at signal 324, or the portable radio is turned on and detected at line 322, or if the controller 310 determines that a condition is present which requires that the switched power supply be maintained (or held) in an On state at line 326, then the transistor Q19 302 will be turned on while Q4 306 is held off by Q31 312 and thereby will turn on and switch in transistor Q4 306 to allow the battery power supply from the vehicle to provide current to the charging circuits at electrical point 330. In this way, the battery charging circuits at electrical point 330 can supply power to recharge, or maintain charged, the rechargeable battery of the portable battery operated device such as the portable radio 106.

The advantageous vehicular charger adapter 100 of the present invention provides smart logic to control the supply of charge from a vehicie's battery to the battery charging circuits at the VA 100 used to recharge the rechargeable battery of a portable battery operated device such as a portable radio. As discussed above, the vehicle's battery is only depleted of charge when absolutely necessary. This is a significant advantage not available in prior art charging arrangements.

Although specific embodiments of the invention have been disclosed, it will be understood by those having skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A battery charging arrangement comprising:
   a supply power interface for receiving power from a mobile power source;
   a battery charging circuit for providing charge to a rechargeable portable battery;
   a controllable power switch electrically coupled to the supply power interface and to the battery charging circuit to selectively switch power from the mobile power source to the battery charging circuit; and
   a battery present detector, electrically coupled to the controllable power switch, for controlling the controllable power switch to selectively switch power from the mobile power source to the battery charging circuit based at least in part on whether the rechargeable portable battery is electrically coupled to the battery charging circuit for receiving a charge therefrom.

2. The battery charging arrangement of claim 1, wherein the mobile power source comprises a vehicular battery power source.

3. The battery charging arrangement of claim 1, wherein the battery present detector controls the controllable power switch to switch in the power from the mobile power source to the battery charging circuit only while the rechargeable portable battery is electrically coupled to the battery charging circuit for receiving a charge therefrom.

4. The battery charging arrangement of claim 1, wherein the wherein the mobile power source comprises a vehicular battery power source, and wherein the battery present detector controls the controllable power switch to switch in the power from the vehicular battery power source to the battery charging circuit only while the rechargeable portable battery is electrically coupled to the battery charging circuit for receiving a charge therefrom.

5. A mobile battery charging arrangement comprising:
   a supply power interface for receiving power from a vehicular power source;
   a battery charging circuit for providing charge to a rechargeable portable battery for a portable communication radio;
   a controllable power switch electrically coupled to the supply power interface and to the battery charging circuit to selectively switch power from the vehicular power source to the battery charging circuit; and
   a battery present detector, electrically coupled to the controllable power switch, for controlling the controllable power switch to selectively switch power from the vehicular power source to the battery charging circuit only while the rechargeable portable battery is electrically coupled to the battery charging circuit for receiving a charge therefrom.

6. The mobile battery charging arrangement of claim 5, wherein the vehicular power source comprises a vehicular battery power source, and wherein the battery present detector controls the controllable power switch to switch the power from the vehicular battery power source to the battery charging circuit only while the rechargeable portable battery is electrically coupled to the battery charging circuit for receiving a charge therefrom.

7. A method in a battery charging arrangement, the method comprising the steps of:
   receiving power from a vehicular power source; and
   selectively switching power from the vehicular power source to a battery charging circuit only while a rechargeable portable battery is electrically coupled to the battery charging circuit to receive a charge therefrom.

8. The method of claim 7, wherein the vehicular power source comprises a vehicular battery power source, and wherein the selectively switching step comprises the step of selectively switching power from the vehicular battery power source to a battery charging circuit only while a rechargeable portable battery is electrically coupled to the battery charging circuit to receive a charge therefrom.

* * * * *